US006706995B2

(12) United States Patent
Miller et al.

(10) Patent No.: US 6,706,995 B2
(45) Date of Patent: Mar. 16, 2004

(54) LASER LIGHT MARKING OF A CONTAINER PORTION

(75) Inventors: Timothy J. Miller, Winter Park, FL (US); Edward C. Miller, Broomfield, CO (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 10/236,193

(22) Filed: Sep. 6, 2002

(65) Prior Publication Data

US 2003/0015507 A1 Jan. 23, 2003

Related U.S. Application Data

(63) Continuation-in-part of application No. 09/690,278, filed on Oct. 16, 2000, now Pat. No. 6,498,318, which is a division of application No. 09/564,429, filed on May 4, 2000, now Pat. No. 6,433,302, which is a continuation of application No. 09/116,794, filed on Jul. 16, 1998, now Pat. No. 6,080,958.

(51) Int. Cl.[7] .......................... B23K 26/00; B23K 26/08
(52) U.S. Cl. .............................. 219/121.68; 219/121.69
(58) Field of Search ................. 219/121.68, 121.69, 219/121.65, 121.72, 121.78, 121.79, 121.8, 121.81, 121.82

(56) References Cited

U.S. PATENT DOCUMENTS

| 3,281,024 A | 10/1966 | Henchert et al. ............ 222/484 |
| D210,870 S | 4/1968 | Markert ........................ D9/356 |

(List continued on next page.)

FOREIGN PATENT DOCUMENTS

| AU | 81794 | 9/1995 |
| DE | 41 03 746 | 8/1992 |
| DE | 19507827 A1 | 8/1996 |
| DE | 197 01 547 A1 | 3/1998 |
| EP | 289 022 | 11/1988 |
| EP | 0 482 776 A1 | 4/1992 |
| EP | 650153 A3 | 8/1997 |
| FR | 2 649 628 | 7/1989 |
| FR | 2 750 396 | 6/1996 |
| GB | 1124958 | 8/1968 |
| GB | 2 185 613 A | 7/1987 |
| GB | 2 320 008 | 6/1988 |
| JP | 63-205291 | 8/1988 |

(List continued on next page.)

OTHER PUBLICATIONS

U.S. patent application Ser. No. 08/069,200, Jendick, filed Apr. 29, 1998.

*Primary Examiner*—Samuel M. Heinrich
(74) *Attorney, Agent, or Firm*—Sheridan Ross P.C.

(57) ABSTRACT

A portion or component of a metal container is provided with markings or indicia using laser light. High-speed laser steering is used to position laser light or laser light pulses across a lateral and longitudinal extent in a relatively short time period such as a time period selected so as to avoid slowing, stopping or otherwise interfering with other container or container component production processes. Preferably, tab stock for container-opening tabs can be provided with 6 to 9 or more visible characters within a time window of 50 to 100 milliseconds or less. Preferably, the size and resolution provided by the pulses are sufficient to permit legible, and preferably attractive, formation of any standard typewriter characters. In one embodiment, other logos, designs, textures, backgrounds and similar features can be provided. In addition to tab stock, container ends can be laser marked during a standard process when a container-opening tab is joined to a container end and/or during an off-line process after the container-opening tab is joined to the container end.

35 Claims, 7 Drawing Sheets

U.S. PATENT DOCUMENTS

| | | | |
|---|---|---|---|
| 3,627,858 A | 12/1971 | Parts et al. .................... 264/25 |
| 3,796,344 A | 3/1974 | De Phillips et al. .......... 220/54 |
| 3,822,496 A | 7/1974 | Minder ........................ 40/307 |
| 3,958,354 A | 5/1976 | Hough et al. ................. 40/307 |
| 4,024,545 A | 5/1977 | Dowling et al. ....... 219/121.68 |
| D261,364 S | 10/1981 | Smyth ........................ D9/438 |
| 4,304,981 A | 12/1981 | Gappa ....................... 219/121 |
| 4,322,016 A | 3/1982 | Barrash ....................... 220/270 |
| 4,323,317 A | 4/1982 | Hasegawa ................... 400/118 |
| 4,331,256 A | 5/1982 | Helms ........................ 220/267 |
| 4,363,179 A | 12/1982 | Ruemer, Jr. et al. .......... 40/307 |
| D268,250 S | 3/1983 | Smyth ........................ D9/438 |
| 4,380,129 A | 4/1983 | Barrash ....................... 40/307 |
| 4,393,411 A | 7/1983 | Amtower .................... 358/302 |
| 4,459,910 A | 7/1984 | Taube ........................ 101/18 |
| 4,465,204 A | 8/1984 | Kaminski et al. ........... 220/269 |
| 4,485,935 A | 12/1984 | Stoffel ........................ 220/270 |
| 4,530,631 A | 7/1985 | Kaminski et al. ............ 413/12 |
| 4,578,329 A | 3/1986 | Holsappel ................... 430/18 |
| 4,635,545 A | 1/1987 | Kubacki et al. ............... 101/4 |
| D289,017 S | 3/1987 | Spangler et al. ............. D9/438 |
| 4,803,136 A | 2/1989 | Bowsky et al. .............. 429/56 |
| 4,922,077 A | 5/1990 | Gordon ................. 219/121.68 |
| 4,965,829 A | 10/1990 | Lemelson ..................... 382/1 |
| 4,998,641 A | 3/1991 | Willoughby ................ 220/268 |
| 5,125,780 A | 6/1992 | Budenbender ................ 413/4 |
| 5,170,279 A | 12/1992 | Schwartz et al. ........... 359/217 |
| 5,191,695 A | 3/1993 | Pavely et al. ................. 29/451 |
| 5,202,199 A | 4/1993 | Mitzutani et al. ........... 429/176 |
| 5,215,864 A | 6/1993 | Laakmann ................. 430/293 |
| 5,235,454 A | 8/1993 | Iwasaki ...................... 359/198 |
| 5,315,108 A | 5/1994 | Gross ..................... 250/233 B |
| 5,331,443 A | 7/1994 | Stanisci ......................... 359/2 |
| 5,401,979 A | 3/1995 | Kooijman et al. ........... 250/561 |
| 5,416,951 A | 5/1995 | Keyaki et al. ................. 24/431 |
| 5,492,077 A | 2/1996 | Rose ........................... 116/307 |
| 5,523,125 A | 6/1996 | Kennedy et al. ............. 427/555 |
| 5,578,120 A | 11/1996 | Takahashi et al. .......... 106/438 |
| RE35,446 E | 2/1997 | Stone .................... 219/121.76 |
| 5,600,478 A * | 2/1997 | Stevens ..................... 359/223 |
| 5,612,525 A | 3/1997 | Apter et al. ................. 235/375 |
| 5,653,900 A | 8/1997 | Clement et al. ........ 219/121.68 |
| 5,718,457 A | 2/1998 | Weinstock .................... 283/70 |
| 5,719,372 A | 2/1998 | Togari et al. .......... 219/121.61 |
| 5,751,436 A | 5/1998 | Kwon et al. ................ 358/299 |
| 5,799,815 A | 9/1998 | Lang .......................... 220/258 |
| 5,800,724 A | 9/1998 | Habeger et al. ............... 216/35 |
| 5,837,962 A | 11/1998 | Overbeck .............. 219/121.68 |
| 5,855,969 A | 1/1999 | Robertson .................... 427/555 |
| 6,105,806 A | 8/2000 | Stasiuk .................. 220/269 |
| 6,462,303 B1 * | 10/2002 | Brown ................. 219/121.69 |

FOREIGN PATENT DOCUMENTS

| | | |
|---|---|---|
| JP | 5-178346 | 7/1993 |
| JP | 8-31391 | 2/1996 |
| JP | 08053121 | 2/1996 |
| JP | 08168890 | 7/1996 |
| JP | 8-175006 | 7/1996 |
| JP | 63-252746 | 10/1998 |
| WO | WO 97/47397 | 12/1997 |

* cited by examiner

LASER LIGHT MARKING OF A CONTAINER PORTION

CROSS-REFERENCE TO RELATED APPLICATIONS

This application is a continuation-in-part (CIP) of U.S. patent application Ser. No. 09/690,278, filed Oct. 16, 2000, which is a divisional of U.S. patent application Ser. No. 09/564,429 filed May 4, 2000, now U.S. Pat. No. 6,433,302, issued Aug. 13, 2002, which is a continuation of U.S. patent application Ser. No. 09/116,794 filed Jul. 16, 1998, now U.S. Pat. No. 6,080,958 issued Jun. 27, 2002.

FIELD OF THE INVENTION

The present invention relates to the use of a laser for marking containers including container body ends and/or tab portions thereof and in particular to a process that can rapidly achieve the desired amount of marking within a predetermined time such as a manufacturing process dwell time.

BACKGROUND OF THE INVENTION

As part of a container manufacturing, or in some cases, filling or sealing operation, markings may be placed on containers for a variety of purposes including identifying contents, identifying the location or date of manufacture or use, identifying the maker of the container or container component, the style or materials for the container, providing of trade names, advertising, promotion, or the like. In some situations, promotional information in the form of sweepstakes, contests, or other valuable tokens or indicia are placed or marked on container or container components.

A variety of devices and procedures have been used for marking containers. In some eases, embossing or incising processes have been used. Embossing or incising, e.g. via stamping, can require an undesirably large inventory of tools, e.g. for different kinds of lettering or symbols, and typically requires the need to shut down an assembly line and disassemble a press whenever it is desired to change tools (such as for changing the indicia being incised or embossed or for maintenance or repair purposes). Such shutdowns are particularly troublesome when it is desirable to change the symbols with relatively high frequency, such as when markings on containers are intended as part of a contest or sweepstakes in which there are preferably a relatively large number of different possible markings or indicia (e.g. when only some of which are "grand prize" winners). Furthermore, it has been difficult to accurately control the depth of embossing or incising and, in some cases, embossing or incising that is too deep has led to leakage or container failure.

Accordingly, it would be advantageous to provide for marking of containers or components in a fashion permitting markings or indicia to be changed with relatively high frequency but without the need to stop or slow down a production line for this purpose. It would also be useful to provide for marking containers while avoiding the need for maintaining relatively large inventories of tools or dies, and preferably while avoiding container quality problems such as may arise from markings which are excessively deep.

Another process which has been used for placing markings on containers or components thereof, has been one or more printing processes. Contact or press printing is sometimes useful for decorating or placing markings on containers where it is desired to place a relatively large number of identical markings on containers. However, contact printing is believed impractical for many components, because of their shape or position (such as container-opening tabs) or when it is desired to change indicia with relatively high frequency (e.g. for sweepstake or contest purposes) because of the need to stop a production line and partially disassemble the contact print device in order to change the configuration of the items being printed on the containers.

In some situations, components of containers may be printed using a non-contact printing process such as an inkjet process. Although inkjets can be controlled to provide relatively frequent changes in indicia, inkjet processes and equipment have been found, in the past, to be relatively unreliable such as requiring frequent maintenance and repair. Inkjet processes have also been found to be subject to unwanted placement or positioning of ink such as resulting in a mist of ink which can interfere with the printing process, cause undesired markings on cans, or cause equipment malfunction. In some cases, it has been found that up to 20% or more of potential production time has been lost to the need for cleaning up, maintenance and/or repair when an ink jet process is used. Additionally, it has been found difficult to achieve reliable adhesion of the ink to containers or container components. Furthermore, when inkjet or other printing processes are used in connection with contest sweepstakes or providing other valuable tokens or indicia, since the process provides only surface markings (without forming indentations e.g. in the container itself) there is an undesirably large potential for counterfeiting or altering the markings e.g. in an attempt to claim a contest or sweepstakes prize. Furthermore, inkjet processes have been difficult to provide at high speed while maintaining quality, so as to mark letters or other indicia without distortion or the like.

Accordingly, it would be useful to provide for high quality marking of containers or container components while avoiding the cleanup, maintenance and repair time associated with inkjet or other printing processes, preferably while permitting relatively rapid changes of indicia.

Some or all of the above difficulties in previous container marking procedures are particularly troublesome for metallic containers or container components such as a typical aluminum alloy beverage container (e.g. of the type available from Ball Corporation, Broomfield, Colo.) or tabs or other components thereof. As compared with, e.g., plastic containers or container components, metal containers can be relatively difficult to mark, at least because it can be difficult to adhere ink to metal surfaces, because of the harder surface of metal containers, higher melting or softening point, and the like. Accordingly, devices and processes used in connection with some container materials are not necessarily applicable to others. In most situations, the functions or purposes for container markings will rarely justify use of procedures which would involve expenses which are substantially in excess of those involved with current processes. Accordingly, it would be useful to provide for procedures and devices for marking containers which can be achieved economically, preferably without substantially exceeding costs or expenses associated with current container production, filling or sealing processes.

SUMMARY OF THE INVENTION

The present invention provides for using laser light for marking metal containers or container components (including, e.g., container bodies, container ends and container end tabs). In one embodiment, a laser is provided with rapid-acting beam-steering and control to permit the marking of a relatively large number of characters or symbols (such as 6 or more, preferably 9 or more) in a relatively short period of time (such as less than about 100 milliseconds, preferably less than a normal component production dwell time e.g. of about 50 milliseconds) so that the desired marking can be achieved without stopping or slowing current container or container component fabrication procedures or machines.

In one embodiment, steering of a laser beam is achieved with high rapidity by reducing the mass of one or more steering mirrors. The resultant device delivers sufficient power density to form visible marks in a metal (e.g. aluminum) container component despite the decreased beam size or aperture associated with the smaller mirror size.

Preferably, the laser light is delivered to the container region or component as a series of high intensity laser pulses. Each pulse forms a visible ablated area or dot and the pattern of dots together make up the desired symbol or image. Accordingly, to achieve a desired number of characters or symbols in less than a predetermined period of time, the device must be capable of delivering all of the pulses needed for forming all of the desired characters within the predetermined time period. In one embodiment, a laser device is provided which delivers pulses at a frequency of at least about 12 kiloHertz (kHz) while providing sufficient power that substantially all such pulses produce the desired spot ablation of the metal container component. The use of a Nd:YVO$_4$ laser has the advantage of improving the overall speed of the marking system since this type of laser uses a lasing medium (Vanadate) that can provide full power at higher frequencies without a diminishing of the power at higher frequencies as is inherent in Nd:YAG type lasers. The output power of an Nd:YAG laser begins to diminish above a frequency of 15 kHz as compared with 40 kHz and higher with a Nd:YVO$_4$.

The laser marking of container ends with tabs can be done off-line. In another embodiment, such container ends that have been previously packaged and ready for attachment to can bodies are marked with indicia or additional indicia after being removed from their packaging. An off-line laser marking system is employed that is different from the conversion press used to form container ends with tabs. This off-line system can be used after container ends with tabs have already been formed and there is a need to add certain one or more marks.

DETAILED DESCRIPTION

Figure 1:
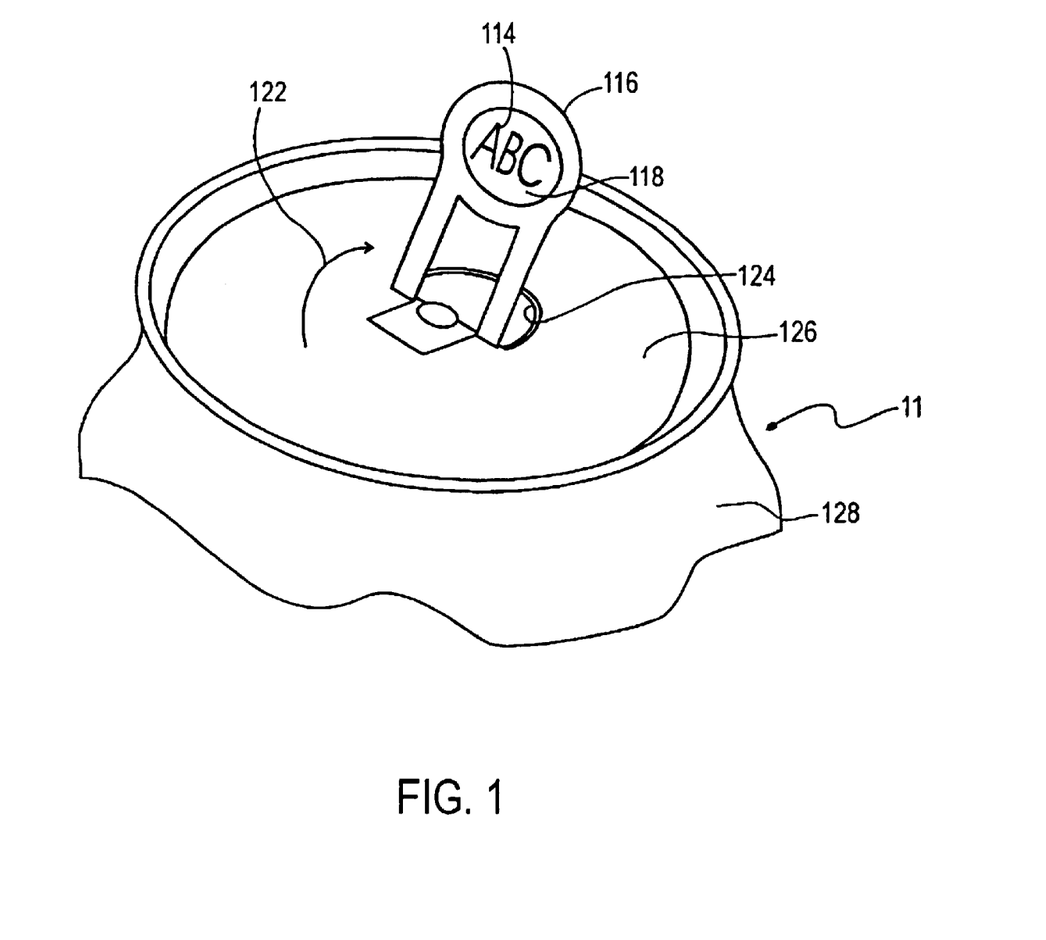
FIG. 1 is a partial perspective view of a container end with a tab marked according to an embodiment of the present invention.

Although the present invention can be used in marking many portions of a container or a container component and marking many shapes and styles of containers, FIG. 1 depicts one example of a container 112 having a marking 114 positioned on a container-opening tab. In the depicted embodiment, the tab 116 includes a covered or web area 118 in the central digit-grasping portion of the tab 116 and, in this embodiment, it is a portion of the web region 118 which bears the marking 114. FIG. 1 shows a configuration in which the tab 116 has been lifted 122 to a vertical position, revealing the underside of the tab (the surface visible in FIG. 1) and, in the process, forming an opening 124 in the can end 126. In the embodiment of FIG. 1, the underside of the tab which is visible in FIG. 1 would normally be nonvisible prior to opening the container, i.e. would be maintained adjacent the outer (public) surface of the container end 126. The upper surface of the tab is not visible in the view of FIG. 1 but would be visible prior to opening the container. Accordingly, the embodiment of FIG. 1 can be used in connection with providing prize or other promotional indicia or other situations in which it is not desired or not necessary for the markings to be visible prior to opening the container. The present invention, however, can be used in connection with marking other surfaces of the container including portions of the underside of the tab other than the central web 118, portions of the upper surface of the tab, portions of inner or outer surfaces of the container end 126 (and/or the opposite end, not shown in the partial view of FIG. 1), and/or inner or outer surfaces of the container body 128.

When it is desired to provide markings on one or more regions of a container-opening tab 116, the markings, in one embodiment, are provided in conjunction with a tab-forming process. In many situations, tab-forming is accomplished by feeding a web of tab stock into a forming machine which uses well known metalworking procedures for forming the substantially flat tab stock into the desired tab shape. Examples of some of the metalworking procedures which may be used include stamping, coining, folding, cutting and the like. For economy of expression, references below to tab-stamping or tab-forming should be understood to include these and other well known tab-forming processes and machines.

Figure 3:
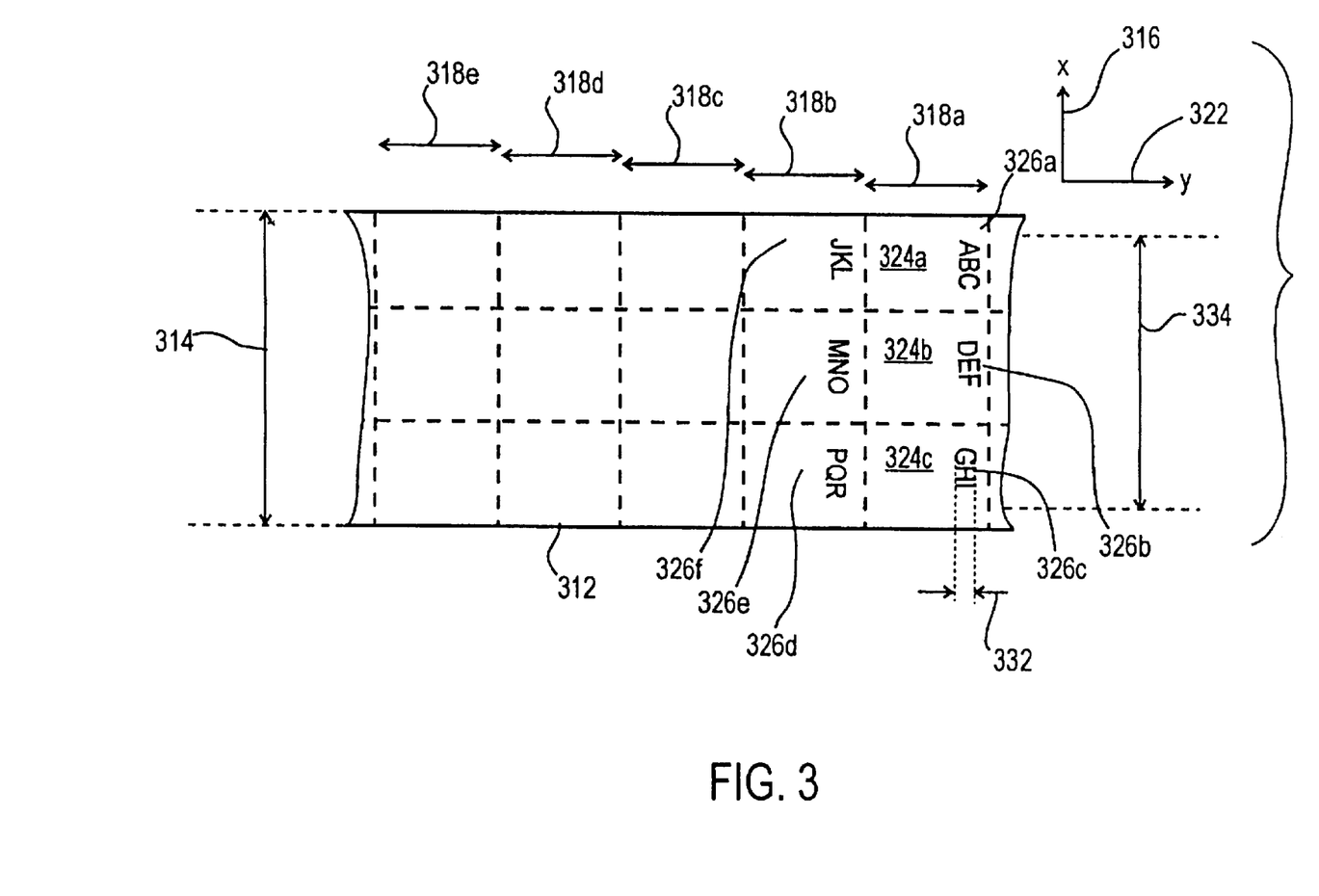
FIG. 3 is a partial plan view of partially-marked tab stock according to an embodiment of the present invention.

As depicted in FIG. 3, in one embodiment the tab stock 312 has a width 314 (i.e. a lateral or x dimension 316) sufficient to form three tabs from a predetermined longitudinal length 318a, b, c, d, e of tab stock 312 (i.e. a length along the longitudinal or y dimension 322). Although the tab stock 312 may have great longitudinal length, such as a web with a length of 3000 meters or more, the tab stock 312 is dimensioned, and in particular, has a width 314 such that each predetermined length 318a, 318e contains sufficient material to form a plurality of tabs, and in the depicted embodiment, sufficient material to form three tabs. Thus, predetermined length 318a can be used to form one tab from each of three laterally arranged regions 324a, b, c.

In one configuration, the tab stock 312 is fed or advanced to a tab-stamping device in an intermittent fashion. According to such intermittent feeding, the tab stock 312 is advanced longitudinally a distance equal to the predetermined distances 318a, b, c, d, e during a first (or "advancement") period. Thereafter, the tab stock 312 is held substantially stationary for a second (or "dwell") period, during which stamping and other operations are performed on one or more predetermined lengths of the tab stock to form, e.g., three tabs. Thus, each cycle of the tab-stamping device includes an advancement period and a dwell period. These cycles are repeated, one after another, preferably forming a plurality of tabs (such as three tabs) at each cycle or stroke of the stamping machine. It should be understood that the stamping machine may be configured to have a plurality of stations or operations e.g. such that, during any one cycle, a first predetermined length 318 is undergoing a first operation, such as cutting, while preceding predetermined lengths 318b, 318c, 318d, etc. are undergoing other operations such as coining, folding, and the like.

Preferably, the tab-stamping cycles are relatively short such as defining a cycle time of less than about 150 milliseconds, preferably less than about 100 milliseconds, in at least one embodiment, a cycle time of about 87 milliseconds (equivalent to a stamping machine having 700 strokes per minute). In one embodiment, the dwell time is about ⅔ of the cycle time and accordingly, the dwell time may be, e.g., about 100 milliseconds, preferably about 50 milliseconds or less.

In one embodiment, the desired markings are formed on the tab stock prior to reaching the stamping operations (i.e. the markings on any given region of the tab stock are formed before that region reaches the stamping device). By configuring the marking operation in conjunction with the stamping operation, registering or positioning the markings on the tab stock so as to reside at the desired region of a finished tab is facilitated.

In order to avoid distortion of the markings that might otherwise be associated with the relatively high acceleration curves used during the advancement phase of the cycle, it is preferred to achieve at least some, and, preferably substantially all of the marking during the stationary or dwell phase of each cycle. Accordingly, in this embodiment, the dwell time defines the length of time (or "window") available for making the desired markings on any given predetermined length 318a, 318b, 318c, 318d, 318e of the tab stock 312. According to the present invention, markings 326a–f are made on the tab stock 312 using laser light. Preferably the laser light is pulsed light, with each pulse being available for forming a single spot or dot such that a plurality of spots are positioned to, together, give the appearance or image of the desired characters or other markings. For example, for aluminum alloys typically used for tab stock, it is believed that delivering laser pulses with a power density of at least about 4K–5K watts per $mm^2$ will suffice to deliver sufficient power to achieve the ablation of aluminum necessary to provide visible spots. In one embodiment, the tab stock is formed of an alloy available under the trade designation 5042, e.g. from Aluminum Company of America or Kaiser Aluminum. Accordingly, the present invention is configured to achieve delivery of laser pulses, each with sufficient power to make a visible dot, sufficient in number to form the desired number and size of characters (with the desired quality or resolution) within the dwell time available for such marking considering any pulse non-application or blanking time e.g. used for accommodating relatively larger mirror movements such as movements between characters or between sets of characters.

In one embodiment, the device delivers pulses at a rate of about 12 kHz and produces at least 6, preferably at least nine characters of the desired quality with a character or letter height 332 of about 0.125 inches (about 3 mm) over a lateral range 334 of about 1 inch (about 2.5 cm).

Thus, in addition to providing a sufficient number of dots within the time window to form the desired size and quality of characters, the present invention is also configured to position those dots, as needed, across an area of tab stock having a lateral extent 334 of about 1 inch and a longitudinal extent 332 of about 0.125 inches, i.e., over an area of about 0.125 square inches.

Figure 2A:
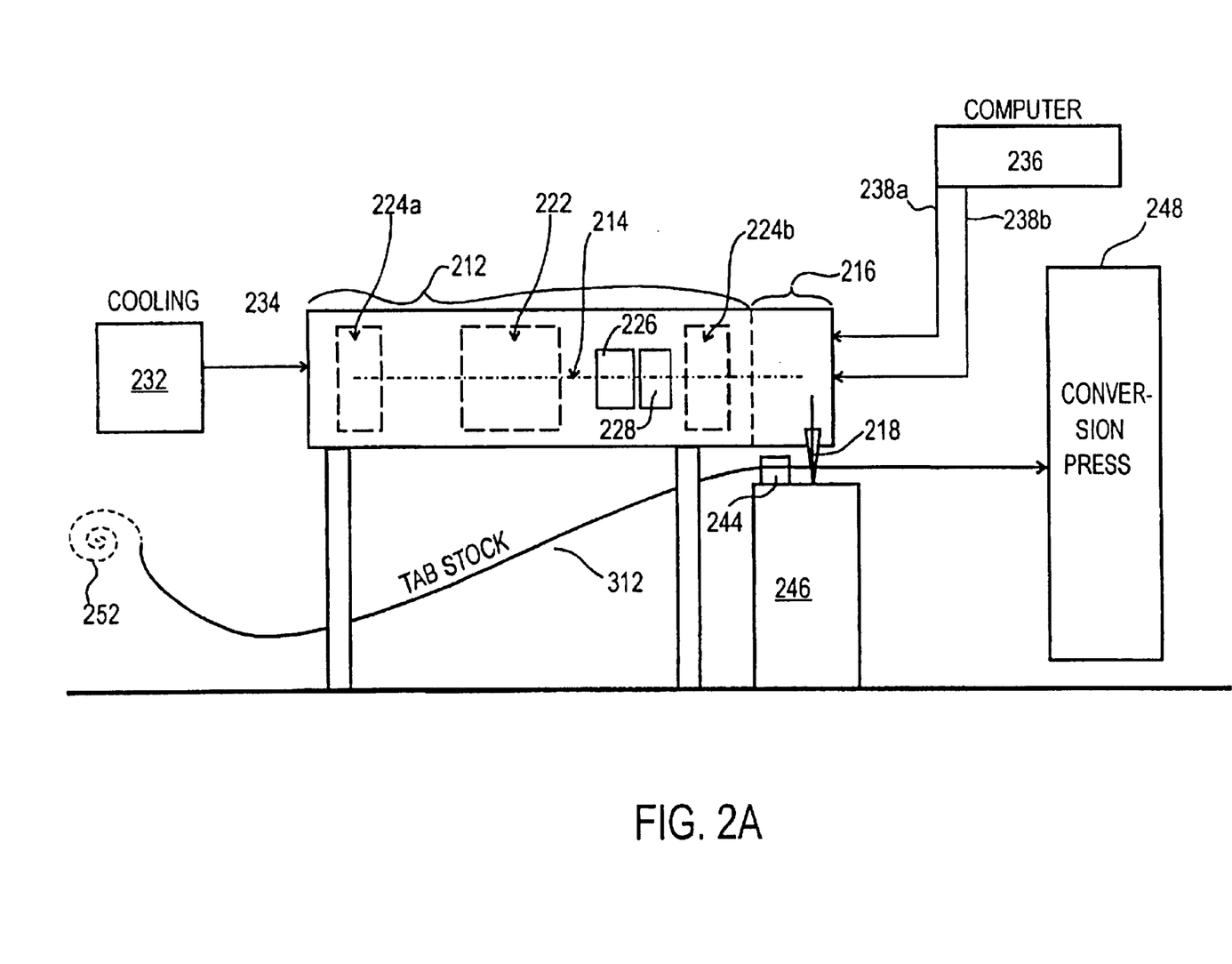
FIG. 2A is a block diagram depicting components of a container tab stock marking device according to an embodiment of the present invention.

FIG. 2A depicts one embodiment of an apparatus which can be used for making such markings within a time window of less than about 100 milliseconds, preferably less than about 50 milliseconds. A portion 212 of the device shown in FIG. 2 is used for generating a pulsed laser beam 214 which is then steered by a portion of the device 216 to output a laser beam 218 along a path so as to position pulses of the beam for forming markings 326 as described above. The laser includes a light source/pumping component 222 positioned between mirrors 224a, b to define a laser cavity. Preferably a safety valve 226 interrupts light output e.g. in the event of failure or container breach. A chopper 228 provides the light in a pulsed or intermittent form. In one embodiment, a Nd:YAG laser provides an output of about 40 to 50 watts (applied power), with about 80% of such power being delivered to the tab stock target. Preferably the laser is configured to output laser light pulses which are relatively stable in the sense that there is relatively little variation in power from one pulse to the next and, preferably substantially all pulses have sufficient power to vaporize or ablate the metal target sufficiently to produce a visible spot or mark. Laser devices that can be used in this regard include those available from Lee Laser of Orlando, Fla. A cooling unit 232 is coupled 234 to the laser generation region 212 to maintain the proper operating temperature of the laser generating unit. A computer 236 which may be, e.g., a workstation-type computer preferably having a Pentium® or Pentium II® processor, outputs control signals 238a, 238b for controlling an x-steering galvanometer 242a and a y-steering galvanometer 242b, respectively, as described more fully below. One example of galvanometers that can be used for this purpose include galvanometers available Cambridge Technology, Inc. of Watertown, Mass. The tab stock 312 is held at the desired distance from the laser and preferably in a vibration-free manner such as coupling guidance/advancement components 244 to a relatively vibration-free pedestal 246 such as a concrete-filled or other high-mass pedestal, vibration-isolation mounting or the like. In this way, a portion of the tab stock 312 can be held stationary during the dwell period for marking. As described above, during the advancement period of each cycle, the tab stock is advanced, using, e.g., drive rollers or the like, toward a stamping unit 248 as it is withdrawn from a tab stock coil 252 or similar source.

Figure 2B:
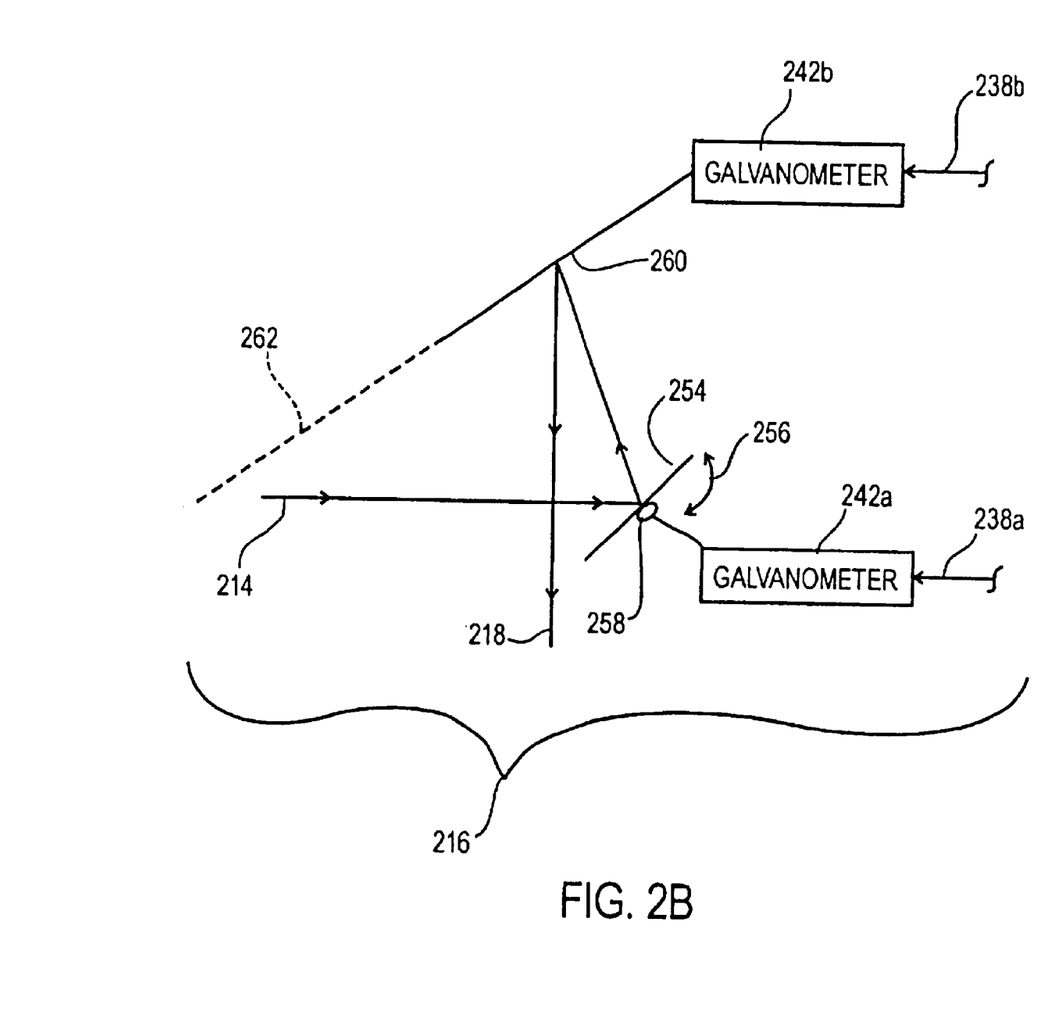
FIG. 2B is a block diagram of steering components of the device of FIG. 2A.

In the embodiment of FIG. 2B, the first steering galvanometer (e.g, a y-steering galvanometer 242a) is coupled to a movable, e.g., pivotable, mirror 254. Galvanometer 242a is coupled to the mirror 254 so that the mirror 254 is pivoted 256 about a pivot axis 258 (perpendicular to the plane of the paper in the view of FIG. 2B) in such a manner that the mirror 254, receiving the laser pulses, will reflect the pulses (to provide first reflected laser light pulses) at an angle whose magnitude depends on the pivoted position of the mirror 254. The first reflected laser light pulses are received by the second mirror 260 which is coupled to a second galvanometer 242b (e.g., an x-steering galvanometer 242b) so as to permit selectable pivoting about a second pivot axis 262 (parallel to the plane of the paper in the view of FIG. 2B) for reflecting the pulsed laser beam (to provide second reflected laser light pulses) toward the desired region of the tab stock 312. In the view of FIG. 2B, the pivot position of the y-steering mirror 254 determines the position of the beam, (with respect to the tab stock 312) in a longitudinal or y direction 322 while pivoting of the x-steering mirror 260 about the second axis 262 determines the position of the laser pulses (with respect to the tab stock 312) in the lateral or x direction 316.

In order to position the laser pulses as needed across the entire lateral extent 334 and longitudinal extent 332 needed to form a set of characters 326a, 326b, 326c as desired, within the dwell period, such as within about 50 milliseconds, the mirrors 254, 260, and particularly the x-steering mirror 260 (responsible for positioning through the relatively larger x range) must be moved quite rapidly. It is believed that previous steering devices have been incapable of, at a reasonable cost, providing such rapid mirror positioning. According to one embodiment of the present invention, rapid mirror positioning is facilitated by providing relatively low mass mirrors. The mirrors, in one embodiment, are provided in a lightweight configuration primarily by providing a relatively small surface or reflective area of the mirrors. In one embodiment, the mirrors have a nominal size or diameter of about 5 mm, such as being a square or rectangle with at least one edge having a length less than or equal to about 5 mm. The low mass mirrors provide a low moment of inertia to assist in rapid mirror movement. Preferably, each of the mirrors presents a moment of inertia to the respective galvanometers of less than about 0.2 $g/cm^2$, preferably less than about 0.1 $g/cm^2$, and more preferably less than or equal to about 0.08 $g/cm^2$.

Because the reflective surface area of the steering mirrors is reduced, the beam size or aperture of the laser light which can be effectively delivered to the tab stock is relatively small. In one embodiment the diameter of the beam upon reaching the tab stock 312 is less than about 5 mm in diameter, preferably less than about 3 mm in diameter.

In order to position the laser pulses, which are preferably being delivered at a rate of about 12 kHz, to the desired position, it is necessary to provide x and y control signals 238a, 238b which control the galvanometers 242a, 242b also at a rate of about 12 kHz. Preferably the computer 236 is configured (programmed) to output control signals to achieve the desired positioning at this rate as well as being controlled to retrieve, create or select the desired characters or indicia 326a–326d as needed for the particular application (e.g. random or pseudo-random indicia for certain contest or promotion purposes) and to make the character or indicia selections rapidly enough to provide a new set of selections during each cycle of the stamping device 248. Although it is possible, at least theoretically, to increase the lateral range 334 or longitudinal range 332 of the beam position by changing the focusing lens to one with a longer focusing distance, such increase in distance also increases the spot size, and thus reduces the power density delivered at the tab stock. For example, by decreasing the focusing distance and therefore spot size by 50% (e.g. by positioning the tab stock closer), the spot size at the tab stock is reduced to half the diameter, thus halving the power delivered, but because the area is proportional to the square of radius, this doubles the power density. However, increasing the power density by providing for closer positioning of the tab stock requires more rapid mirror movements to maintain the same marking speed (for a given range of character placement). Thus, in one embodiment, the tab stock 312 is positioned such that the spot size of the laser pulses as delivered to this tab stock has a diameter of about 0.003 in and a power density of about 4 K to 5 K watts per $mm^2$.

Figure 4:
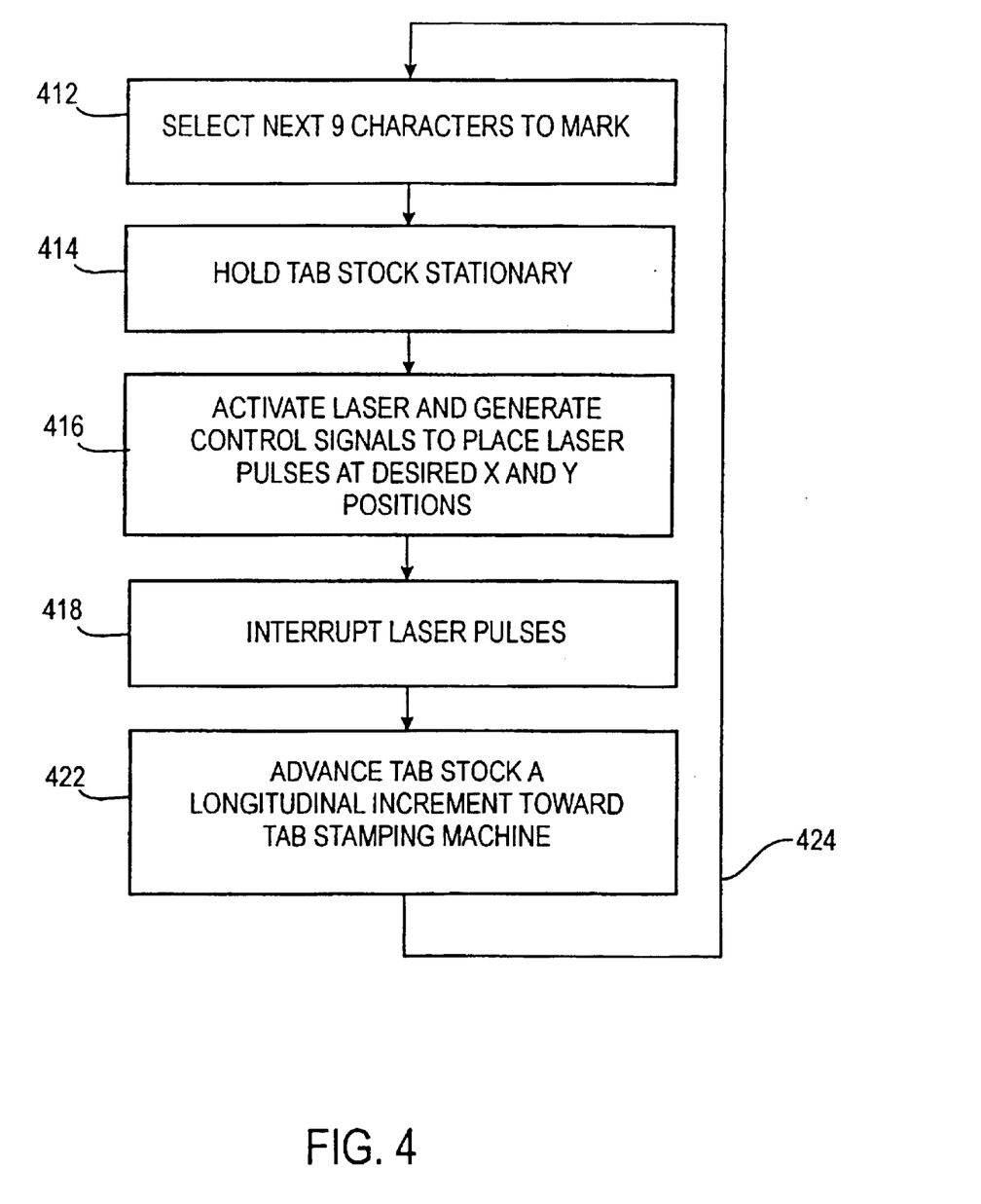
FIG. 4 is a flow chart depicting a marking process according to an embodiment of the present invention.

In operation, as depicted in FIG. 4, during one portion of the stamping cycle, the computer 236 selects the next nine characters which are to be marked on the tab stock 412. When the dwell period of the stamping cycle is reached, the tab stock is held stationary 414 and the laser light output is activated while the computer generates control signals to place laser pulses at the desired respective x and y positions to render the desired visible markings 416. After the desired markings have been made, the laser pulses are interrupted 418 and, during the advancement portion of the cycle, the tab stock is advanced a predetermined longitudinal increment toward the stamping machine. Thereafter, the cycle is repeated 424 as needed to provide the desired number of marked tabs or until the tab stock is depleted.

In light of the information provided herein, a number of advantages can be seen. The present invention is able to achieve markings of containers or container components at a relatively rapid rate, and, preferably, sufficiently rapidly to keep pace with other container or container component forming processes so that the marking can be achieved without slowing or interfering with such processes. The present invention makes it practical and feasible to provide markings which can be readily changed or customized, including markings which are different for each container or container component in a sequence of containers or components. The present invention can achieve such rapid markings substantially without distortion or deformation of the markings and without weakening, piercing or damaging the container or container component. The present invention makes it practical and feasible to provide six or more, preferably nine or more, legible, 0.125 inches tall or larger characters distributed or positioned across the width of tab stock in connection with a tab-forming process during a relatively short time period such as a tab-forming dwell time, preferably within about 100 milliseconds and more preferably within about 50 milliseconds. The present invention makes it possible to steer the positioning of laser pulses having sufficient power to mark or ablate metal across a lateral extent of about one inch and a longitudinal extent of about 0.125 inches within a time period of less than 100 milliseconds, preferably less than about 50 milliseconds. The present invention provides for container or container component marking which is less maintenance-intensive or more reliable than other marking procedures and devices and permits changes to markings without the need to stop or slow a container or container component fabrication device or process. The present invention facilitates implementation of contests, sweepstakes or other promotions which involve providing indicia on components or containers preferably on an undersurface of tabs coupled to containers, preferably so as to be non-visible prior to opening a container, e.g. awarding at least a first prize (indicated one of such indicia) to a customer upon verifying presence of the prize indicium e.g. on a tab. Because the characters, indicia, symbols and the like to be marked can be designed/created entirely (potentially) in software (i.e. without the need for ordering or creating dies or the like) the lead time involved between design of a promotion, game, or the like, taking of an order or other initiation event, and the time in which production can begin is substantially shortened compared to hardware-dependent procedures such as incising or embossing.

A number of variations and modifications of the invention can be used. Although the present invention provides for a cost-effective procedure and device which may include a laser that delivers sufficiently-powered pulses at a rate of about 12 kHz, it is also possible to use the present invention in connection with other lasers, including lasers that have a higher pulse rate or higher power, preferably with each (or substantially each) pulse delivering sufficient power to ablate or vaporize aluminum or other metal such as to provide a visible mark. Although a galvanometer-based beam steering procedure and device has been described, other steering may be used including acoustico-optical steering in place of or in addition to galvanometer based steering, which offers the potential for steering which is at least partially independent of the mass of mirrors or other components and, thus, potentially more rapid. Although a computer has been described in connection with providing control or control signals for laser steering, other devices and procedures for providing control signals can be used including digital signal processors (DSP) which are believed to offer the potential for generating control signals at a relatively high rate, at least partially because of the elimination or reduction of rate dependency based on bus speed or the like.

Although embodiments have been described in regard to marking of stock used for forming tabs, the present invention can be used in connection with marking other portions of metal containers such as ends or end caps, body or sidewall portions, container bottom portions and the like.

Although a particular container end shape as depicted in FIG. 1, the present invention can be used in connection with a wide variety of metal containers including beverage containers, food containers, aerosol containers and the like. Although the present invention has been described in connection with marking of aluminum container or container components, the present invention can also be used in connection with marking other types of metal containers such as steel containers. Although the present invention has been described in connection with ablating or vaporizing portions of the metal of a metal container, it is also possible to use the present invention in connection with ablating or vaporizing some or all portions of coatings placed on a metal container, so as to provide markings that are visible by way of a contrasting color or texture. For example, it is possible to provide a metal container or container component which has been coated with a colored coating (such as by printing or painting) and to use the present invention to selectively remove or vaporize portions of such coatings to reveal at least some of the metal portion (or another coating) underneath. In this situation, it may be possible to use a lower-powered laser such as a $CO_2$ laser.

Although the embodiment of FIG. 1 depicts a tab having a web in the finger grasp region, it is also possible to use the present invention in connection with a tab in which a finger hole is provided in the finger grasp region and in which markings are positioned on other portions of the tab.

Although the present invention has been described in connection with certain markings which will typically be viewed or visible to consumers such as promotional or contest marking, advertising, logos, etc., it is also possible to use the present invention in connection with markings which will typically be concealed such as being concealed under a fold of the tab or other container component. As one example, concealed markings may be used for security or verification purposes, e.g. to verify that a prize-indicating marking is genuine and not counterfeit.

Although the present invention has been described in connection with providing markings during a stationary or dwell time, it is also possible to use the present invention to make some or all markings during movement of the tab stock or other target substrate, particularly when the markings are security or internal markings or otherwise will not normally be seen or used by the ordinary consumer (such that a certain amount of distortion may be acceptable). By being able to process parts for the full cycle time, such a system allows for either more data processed per part, or more parts processed per unit time.

The process of can end manufacturing inherently requires a dwell time and a part index time. The laser marking for either can end or tab stock can be done while the part is stationary (during the dwell time), or while the part is in motion (during the part index time). In general, the dwell time is about two-thirds of the processing time and the part index time is about one-third the processing time.

The laser marking process will distort the marked image during periods of rapid acceleration or deceleration. This is the case during the beginning and the end of the part index time, rendering that part of the time unusable.

An off-line system can be designed to utilize the full processing time, that is, the sum of the dwell time and the part index time. Such a system will process a part moving at a constant velocity, permitting the laser to mark the part on the fly for the entire process cycle. The constant part velocity avoids the acceleration and deceleration problems associated with part indexing.

In the case of tab stock marking, such a system will process the coil stock before it enters the press. A coil reel feeds a constant velocity coil transport system. The transport feeds coil at a rate equal to or greater than the feed rate of the press. When the system is initially set up, the coil is stretched tight between the press and the feed transport. This is a known and exact distance. This relationship defines the first mark location. The laser marking system starts processing the coil before it enters the press. This permits the laser marking system to fill a well with pre-marked coil stock. The press is started after the well is full and the press pulls coil from the well as the laser marking system feeds coil into the well.

The process requires the part index distance to be a constant. If the part index distance has a deviation, the accumulated error can be eliminated by placing an encoder before the press. The encoder information is processed by the laser marking system's computer, which will adjust the mark location according to the encoder information. The error is not corrected where the marked coil stock enters the press, rather it is corrected where the next mark enters the well. This correction technique assumes that any error accumulated over the distance of the parts in the well is acceptable.

In the case of end marking, the system will post-process can ends as they leave the press, after all metal-forming operations have been completed. The can ends leave the indexing belt and are placed on a constant velocity conveyor. A sensor on the conveyor will sense the leading edge of the can end and will send a signal to a vision system. The vision system will image the can end to determine the X, Y, and Theta position. This information is sent to the marking station so that the position and rotational orientation of the marking will be consistent with that of the can end.

Although the present invention has been described in connection with beam steering which utilizes two separate mirrors, it is possible to provide for beam steering which uses a single mirror (e.g. which is pivotable with respect to two independently controllable axes, and/or which is deflectable or deformable). Although the present invention has been described in connection with a process which uses a single laser for writing all the desired markings during any given cycle (believed to be particularly useful when it is desired to provide markings in a low-cost manner), it is nevertheless also possible to use the present invention in connection with a system having two or more lasers such as for writing different characters or different portions of characters so as to achieve a higher number of characters in a given amount of time. Although the present invention has been described in connection with a procedure providing at least six legible characters, preferably at least nine legible characters per cycle, the present invention can also be used in connection with devices or procedures which produce more or fewer characters.

In general, it is possible to use some aspects of the invention without using others. For example, it is possible to provide for rapid marking of characters or other indicia without providing for randomly or otherwise changing the indicia with each cycle. For example, in view of the ability to rapidly change or modify the nature of the indicia or markings provided, the present invention can be used to provide markings which indicate time and/or date of manufacture, filling, sealing and the like. Although the present invention has been described in connection with making markings e.g. for promotional, advertising, identification or similar purposes, it is also possible to use the present invention in connection with making lines, grooves, or other formations which may be at least partially functional or structural such as by using the present invention to create opening-defining scores in container ends and the like. Although the present invention has been described in connection with placing markings on tab stock before the tab stock is formed, cut or attached to containers or container ends, it is possible to provide the steps in other orders such as marking tabs e.g. after folding but before cutting, after cutting but before attachment to containers, or after attachment to containers.

Figure 5:
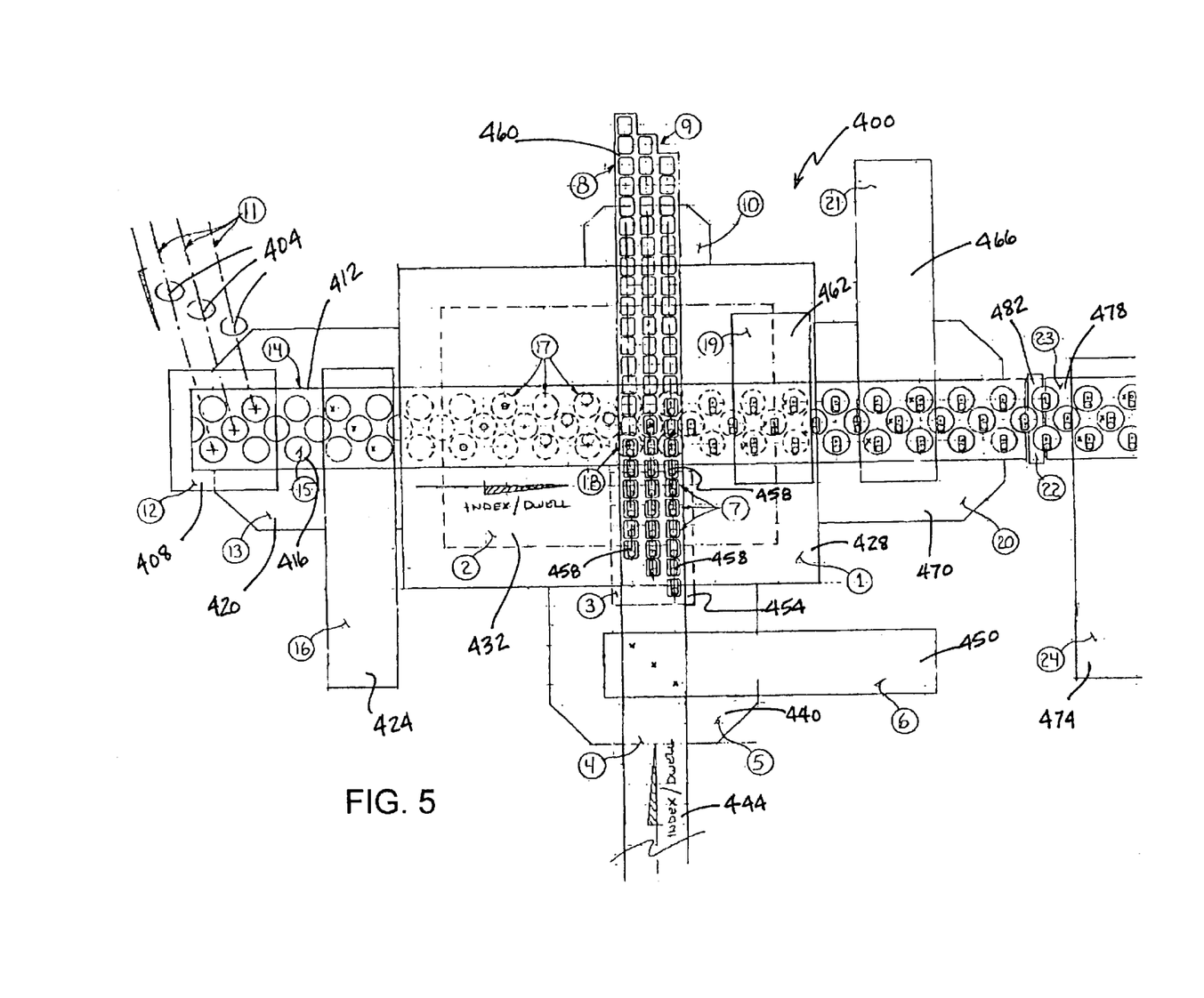
FIG. 5 diagrammatically illustrates a conversion press that includes laser marking at one or more stages.

With respect to an embodiment in which a container portion being marked includes a shell or a shell-in-progress that is to become a converted end having a scored section that is to be opened by a tab, reference is made to FIG. 5 which diagrammatically illustrates a conversion press 400. The conversion press 400 is used to form container ends having tabs for subsequently joining to container bodies. The conversion press 400 is fed a number of shells 404 using a suitable feed mechanism that includes a downstacker 408 for use in properly positioning the shells 404 relative to a transfer belt 412 having a number of pockets 416 that are used in holding the shells 404. The transfer belt 412 is caused to move and carries the shells and shells-in-progress to pre-established stations or stages of the conversion press 400 at which predetermined processing occurs. The transfer belt 412 is supported using an infeed apron 420. In one embodiment, a press infeed laser marker 424 is provided having portions disposed in a vertical direction above or away from the shells 404 that are movable on the transfer belt 412. Laser marking can be accomplished using the same structure and operations previously described. As also previously indicated, such laser marking is done on one or more shells-in-progress 404 during a cycle dwell time in which one or more conversion press functions are being accomplished for other shells-in-progress 404. These other functions can include shell shaping, shell forming, shell cutting, scored section forming, tab forming and tab joinder to shells-in-progress. In connection with providing the shells 404 in a desired or predetermined orientation to enable laser marking thereof, in this embodiment, the pockets 416 are employed so that the laser marks are created on the desired part or area of the shell. Such desired orientation associated with the pockets 416 can be provided using a vacuum that holds the shells 404 in place. In another embodiment where the shells 404 are made of a suitable material (e.g. steel), magnetic attraction can be utilized to hold the shells 404 in place. On the other hand, if random marking, rather than predetermined marking, can be utilized, then orientation of the shells 404 is not necessary and, even though such may be used, no vacuum or magnetic force need be applied.

In the embodiment of FIG. 5, the one or more marks are made by the laser while the transfer belt 412 is not moving or is stationary for at least a predetermined time interval. As previously discussed, this time interval can be part of a dwell time associated with a cycle of conversion press operation. The dwell time can be part of or associated with a normal dwell or process stoppage in forming converted ends from shells 404. In the preferred embodiment, the dwell time required to perform laser marking can be defined in terms of movement of the transfer belt 412, which is driven using a rotatable mechanism. As applied to the dwell time, the range of such rotation for acceptable laser marking is from about 30° of rotation to about 300° of rotation (marking time range). Specifically, the dwell time is in a range of time that is equivalent to time that a rotating output rotates in the range of 30°–300°. This rotating output is used to cause movement of the shell or shell-in-progress 404. For example, a dwell time associated with a 180° rotation is indicative of that amount of time that the transfer belt 412 is moving when the rotating output rotates 180°. This range of dwell times is related to the revolutions per minute (rpm) of the rotating output used in driving the transfer belt 412. The range of rpms can be 300–600 rpm. For making measurements or monitoring dwell time based on degrees of rotation, an intermitting gear box, programmable drive motor, or other suitable device useful in controlling dwell time during a continuous cycle could be incorporated.

In the embodiment that does have the press infeed laser marker 424 or, alternatively, in the embodiment that does not include the laser marker 424, the transfer belt 412 next carries the shells 404 and shells-in-progress to a general press 428. The general press 428 is used in performing a number of functions related to changing the shells 404 to converted ends that will include tabs. The general press 428 can be conventional hardware and mechanisms that perform such functions. The general press 428 has a ram area 432 in which the scored section or other removable metal is formed and which is to be subsequently opened using a tab on the converted end. As is normally done and which is part of the prior art, the creation of the scored sections in the shells-in-progress 404 is accomplished while the transfer belt 412 is stationary for a desired dwell time.

The conversion press 400 also includes a front apron 440 that supports moving tab stock 440 from which tabs are to be formed and which are to be joined to shells-in-progress 404. In one embodiment, the tab stock 444 can be marked using a tab infeed laser marker 450. The tab infeed laser marker 450 is stationed before a tab area 454, which forms rows of tabs 458 from the tab stock 444. In the illustrated embodiment, each row can be formed with three tabs 458 like the previously described embodiment in which laser marks are formed on tabs. Since the tab infeed laser marker 450 is stationed upstream of the tab area 454, one or more marks can be created in the tab area 454 using its laser beam or light on the tab stock 444 at those regions that are to become tabs 458. In one embodiment, portions of the tab infeed laser marker 450 are vertically above the tab stock 444 to provide marks on outward portions of the tab stock, although laser marking could be provided on lower portions of the tab stock 444. Additionally or alternatively, one or more marks could be provided on both outer and inner portions of the tab stock 444 relative to the front apron 440. When the laser marks or indicia are provided when the tab infeed laser marker 450 is disposed above the tab stock 440 and such indicia is to be hidden on the under surface of the tab (non-visible until the tab is used to open the scored section), the tabs 458 are caused to move after laser marking, such as by an endless belt, to reverse their previous orientation. After this reversal, the tabs 458 can be joined to the shells-in-progress 404 so that the indicia faces downward toward the shells-in-progress.

In forming the tabs 458 from the tab stock 444, as is typically done, the tab stock 440 is stationary during the time that the conversion press 400 mechanisms are forming the tabs 458 from the tab stock 440. The formed tabs 458 continue their movement after any laser marking. Each of the tabs 458 then becomes aligned with its respective shell-in-progress 404 and which is being carried using the transfer belt 412 below the tabs 458. When one or more tabs 458 is aligned with one or more shells-in-progress 404, during predetermined dwell times, the tabs 458 are joined to their respective shells-in-progress 404 by conventional mechanisms. After such joining including the removal of the tabs 458 from remaining portions of the tab stock 444, the remaining portions of the tab stock or the scrap web 460 is carried away from the transfer belt 412.

During movement of the transfer belt 412 (a non-dwell time), the shells-in-progress 404 with tabs 458, in one embodiment, can be moved in alignment with an outfeed, inside press laser marker 462. The outfeed, inside press laser marker 462 could be employed instead of one or both of the press infeed laser marker 424 and the tab infeed laser marker 450. That is, the location of the outfeed, inside press laser marker 462 could be used as the station or location at which all desired laser marking of the container end including its tab (when indicia is located on the outer surface of the tab 458) is conducted. This location of the laser marker 462 provides one of a number of different locations associated with the conversion press 400 at which laser marking could occur.

Other embodiments, based on the location of one or more laser markings stations, can also be provided. For example, an outfeed laser marker 466 can be provided downstream of the general press 428 and along a path traversed by the transfer belt 412 carrying container ends including tabs. Support at this location is provided using an outfeed apron 470.

In still another embodiment, instead of a laser marker being located along or at an existing part of the conversion press 400, such a unit could be stationed at a location that extends from the outfeed apron 470. As seen in FIG. 5, an off-press transfer laser marker 474 is depicted having portions vertically aligned with converted ends. The converted ends are transported from the outfeed apron 470 and from the transfer belt 412 to an off-press transfer belt 478 by means of a transfer plate 482.

As can be appreciated, a number of the afore-described laser markers at their particular locations could be included with the conversion press 400; however, it is likely that less than all of such laser markers would be utilized. In any event, each of the one or more laser markers can have the same structure and perform the same operations to achieve the functions and results described in the embodiment particularly describing laser marking of tabs.

Figure 6:
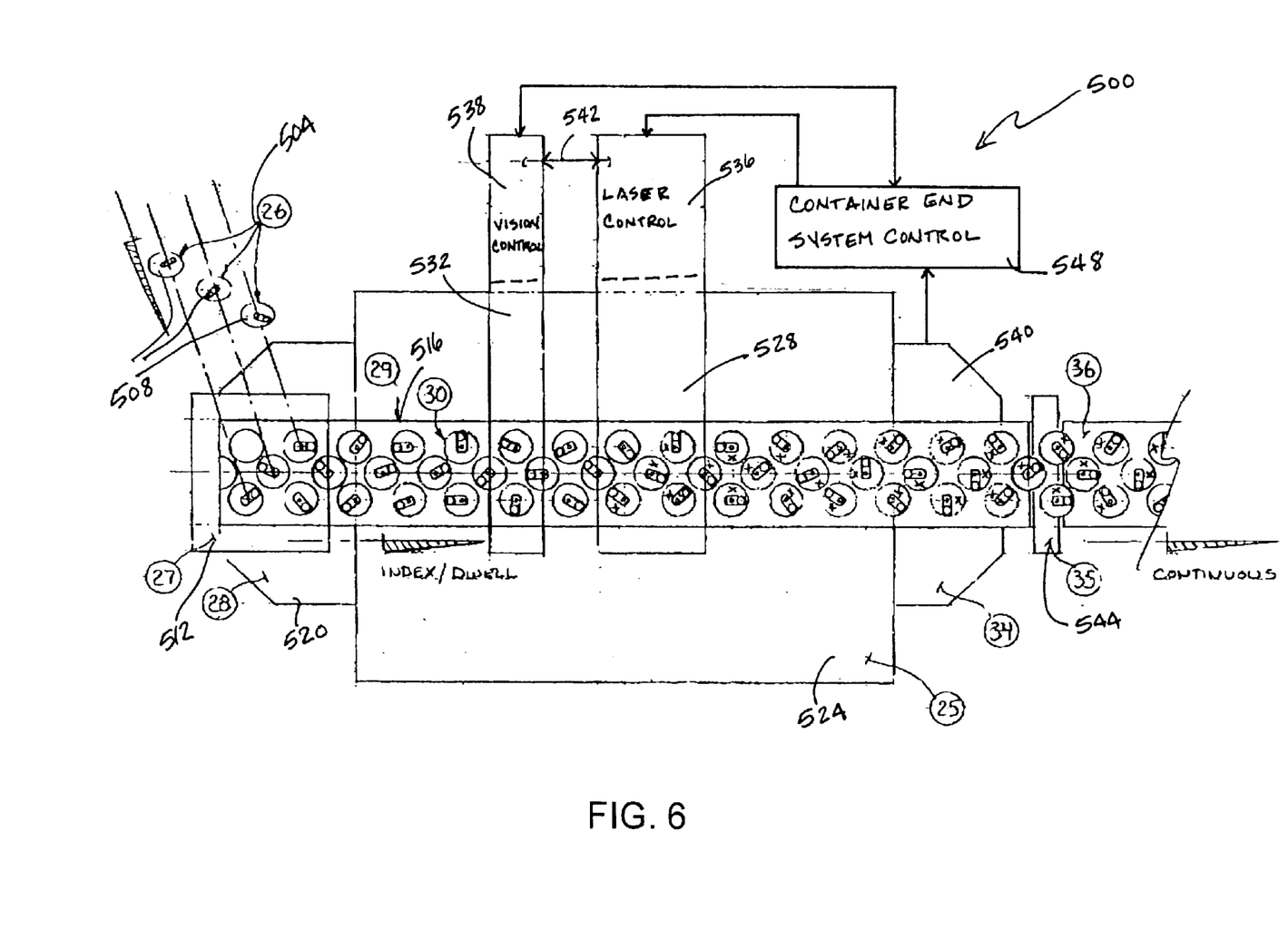
FIG. 6 diagrammatically illustrates an off-line laser marking system that can be used to mark container ends having tabs.

Referring to FIG. 6, an off-line laser marking system 500 is diagrammatically illustrated for providing one or more marks on converted ends 504 that include tabs 508. The off-line system 500 is separate from the system normally used in forming converted ends having tabs, such as the conversion press 400 of FIG. 5. The off-line system 500 can be provided separately from a conversion press 400, including at a different location than the facility housing the conversion press 400. In one embodiment, the converted ends 504 can be made using the conversion press 400. Sometime later, those same converted ends are transported and act as an input to the off-line system 500.

The off-line laser marking system 500 allows for marking of converted ends including their tabs after the converted ends have been formed by the conversion press 400 or some other conversion press. The need for the off-line system 500 can arise as a result of solving a problem related to a need to have one or more marks on the converted ends after they have been formed using the conversion press 400 or some other conversion press. By way of example only, one or more marks may be required to provide readable indicia indicative of container recycling information, such as adding refund information that is required by a particular territory or state, which offers a refund for the container if it is returned for recycling. If it became necessary to indicate that a particular state has a 5¢ refund for the container, this information can be added using the off-line laser marking system 500. Instead of not being able to use previously formed container ends because they fail to include such refund information, the container ends can be input to the off-line system 500 for incorporating such marks, such as those related to a refund for a particular state. Continuing with this example, container ends that are packaged in alignment (on top of each other) after exiting the conversion press 400 and then stored for anticipated shipment, can be modified with one or more marks after a determination is made that such container ends must be changed in order to comply with the refund-related laws of one or more particular states. In such a case, the laser indicium to be included can be marked on container ends without any previous laser marking or such laser marking can be added to already existing information on the container ends. The pre-existing information can be as a result of laser marking, or any other means that provides indicia on the container end including its tab.

When the container ends 504 are to be input to the off-line system 500, they can be transported to the off-line system 500 in the same packaging that was used after exiting the conversion press 400 or some other container end forming system. After being removed from their package, the container ends 504 are received by a downstacker 512 to be suitably positioned relative to an off-line transfer belt 516 that is movable with an off-line infeed apron 520 disposed therebelow. The individual container ends 504 output from the downstacker 512 are carried by the off-line transfer belt 516 to an off-line laser marker 524 until one or more of them, in turn, is aligned and properly positioned relative to an off-line laser marker 528. In one embodiment, laser marking can be done precisely on a predetermined region or area on the container end including its tab. The laser marker 528 can be equivalent to that previously described in connection with laser marking of tab stock, except that communications are conducted using the off-line laser marker 528 and a vision subsystem 532. The vision subsystem 532 is used in obtaining image data indicative of the locations of the container ends 504. This information is required so that the laser marker 528 can properly locate the laser light or beam relative to this determined position. For example, the vision subsystem 532 can determine the relative location of the tab 508 on a particular container end 504. With this as a reference, and with reliance on known information related to the predetermined area on the container end that is to be marked, the off-line laser marker 528 can control the laser light to strike that desired area on the container end 504.

Regarding the enabled communications, the off-line laser marker 528 can include a laser control 536. In one embodiment, the laser control 536 can include software and computer hardware that operates using a known or conventional operating system. The laser control 536 is configured and/or operates differently when interfacing with the vision subsystem 532 since it requires image information from the vision subsystem 532 in order to properly control application of the laser light on the particular container end 504 area. This image information can be provided by a vision control 538 of the vision subsystem 532, which communicates with the laser control 536 using a communications interface 542. The communications interface 542 can be by way of an internal NetBIOS commands utilizing an ethernet link. The vison control 538 can also comprise software and computer hardware, such as a PC that runs with a conventional operating system. The vision control 538 controls other components of the vision subsystem 532 in capturing image information. As part of the image capturing, the vision control 538 can make determinations related to verifying the capture of such image information, particularly location data related to the position of a particular container end 504 on the transfer belt 516. With respect to obtaining location data for a container end 504 on the transfer belt 516 and its position relative to the off-line laser marker 528, in one embodiment, there is a space or distance between capturing of image information for one container end 504 by the vision subsystem 532 and the marking of another container end 504 by the laser marker 528, which space is equivalent to one container end. Location data for one container end (associated with the vision subsystem 532) is buffered and later transmitted to the laser control 536 during the time the next container end is moving in alignment with the vision subsystem 532 and the image information for this next container end is being obtained and analyzed to determine the location of its region to be marked. A packet of location data related to a container end 504 can be sent from the vision control 538 to the laser control 536 in about 3 milliseconds.

Also involved with laser marking control is a container end system control 548 that can include a programmable logic controller associated with the container end transport system that includes the transfer belt 516. The container end system control 548 communicates with each of the laser control 536 and the vision control 538. Among other signals, the container end system control 548 develops a part-in-dwell signal indicative of whether the part (e.g., container end) is moving or stationary (in-dwell). For example, when the part-in-dwell signal is high, container ends are moving and when the signal is low, the container ends are stationary or not moving. The laser control 536 and the vision control 538 depend on the state of the part-in-dwell signal in performing their functions. During the dwell or stationary time, the laser control 536 is involved with controlling laser marking of one or more container ends 538 with which it is aligned at that particular instance in time. Simultaneously, the vision control 538 is involved with obtaining image information, particularly container end location data, for the next container end or ends that are to be laser marked. During the non-dwell time and when the container ends 504 are moving, the laser control 536 is receiving location data for the next container end or ends 504 that are to be laser marked and uses that data to prepare other components of the laser marker 528 for proper marking of the desired region of the container end(s) 504. The vision control 538, while the container ends 504 are moving, is buffering image information for the next one or more container ends 504 and is also involved with sending location data for the next container end(s) to be laser marked.

In addition to the part-in-dwell signal, a write complete signal is also sent from the laser control 536 to the vision control 538, which provides verification to the vision control 538 that the laser marker 528 has completed marking one or more particular container ends 504 before the vision control 538 is to send location data for the next container end(s). Other signals from the vision control 538 include a light on/off bit which is used in controlling activation of the laser beam of the laser marker 528, and three error bits. The three error bits are communicated to the container end system control 548, which can be utilized in controlling operation of the off-line system 500. These three error bits are: (1) find failed bit (one or more container ends 504 could not be located by the vision subsystem 532); (2) part-in-dwell time-out bit (the vision control 538 failed to receive a part-in-dwell signal within a predetermined time interval, such as 120 milliseconds); and (3) vision stopped bit (the vision control 538 is not properly operating).

As noted, the off-line system 500 receives container ends 504 that are already formed with tabs 508. Since the container ends 504 are placed in a random manner onto the transfer belt 516, a vision subsystem 532 must be employed to determine the locations of the container ends 504 relative to the transfer belt 516 so that laser marking on the correct region or area is achieved, for example, relative to or on one or more tabs 508. The use of the vision subsystem 532 in the off-line system 500 contrasts with the conversion press of FIG. 5. In that embodiment, the shells are essentially uniform when received by the transfer belt 412. Once on the belt 412, they remain in that position. The location of the scoring and the tab are therefore known and keep that same position on the transfer belt 516 for any laser marking, regardless of where the laser marker 528 is located relative to the transfer belt 516. That is, the one or more laser markers of FIG. 5 that might be utilized can be provided with, or can provide, location related information in controlling or steering the laser light so that laser markings are made at desired regions.

With respect to laser marking a predetermined area or region, the container end 504 can be held in the determined place by a vacuum or some other appropriate means, such as magnetic attraction when the container end 504 is made of certain metals, such as steel. In the case of marking at one or more predetermined locations on the container end 504, once such information is known by the laser marker 528 through the data provided by the vision subsystem 532, marking of the container end 504 can occur. Preferably, such marking is done while the off-line transfer belt 516 is not moving or is in its dwell state. Like that described in conjunction with the conversion press 400, the laser marking requires a dwell time from about 30° of rotation to about 300° of rotation. This can be accomplished with the use of an intermitting gear box, programmable drive motor, or other mechanism capable of controlling dwell time during continuous cycling.

After laser marking, the container ends 504 are carried by the off-line transfer belt 516 in the direction of the off-line outfeed apron 540. In one embodiment, the off-line transfer belt 516 terminates at a transfer plate 544 that couples the laser marked container ends 504 to a continuous transfer belt 548. Eventually, the laser marked container ends 504 are packaged similarly one on top of the other as they were packaged previously after being formed in the conversion press 400, or some other container end forming system. The packaged laser marked container ends can then be shipped to location for joining to container bodies.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

What is claimed is:

1. Method for marking a portion of a container, comprising:

generating laser light;

outputting control signals to a light path deflection system that positions said laser light along a path towards said portion of said container;

marking said portion of said container after said outputting step with a plurality of markings while said portion of said container is substantially stationary during a dwell time associated therewith and in which said dwell time is less than about 100 milliseconds; and moving said portion of said container at least after said marking step.

2. Method, as claimed in claim 1, wherein:

said dwell time is in a range of time that said portion of said container end moves when a rotating output, when used to move said portion of said container, rotates at least 30° and no greater than 300°.

3. Method, as claimed in claim 2, wherein:

said rotating output is produced by a rotatable mechanism that causes said rotating output to be at least 300 rpm and no greater than 800 rpm.

4. Method, as claimed in claim 1, wherein:

said portion of said container is a container end and said container includes a tab, said marking step including marking said container end before said tab is joined to said container end and said method further includes a second marking of at least one of said container end and said tab after said tab is joined to said container end.

5. Method, as claimed in claim 1, wherein:

said portion of said container is one of a tab and a container end.

6. Method, as claimed in claim 1, wherein:

said light path deflection system includes at least a first movable mirror having a nominal dimension of less than about 5 mm and said outputting step includes using at least one of said control signals to move said first mirror.

7. Method, as claimed in claim 1, wherein:

said outputting step is conducted using at least one of a computer and a processor and said marking step includes one of retrieving, creating and selecting said plurality of markings using said at least one of said computer and said processor.

8. Method, as claimed in claim 1, wherein:

said container is an aluminum container.

9. Method, as claimed in claim 1, wherein:

said portion of said container is a tab and said container includes a container end and in which said marking step is conducted after said tab is joined to said container end.

10. Method, as claimed in claim 1, wherein:

said portion of said container is a container end and said container includes a tab and in which said marking step is conducted after said tab is joined to said container end.

11. Method, as claimed in claim 1, wherein:

said portion of said container is a container end and said container includes a tab and in which said marking step is conducted before said tab is joined to said container end.

12. Method, as claimed in claim 1, further comprising:

providing a package containing a number of container ends including at least a first container end having a first tab;

opening said package;

locating at least said first container end relative to said laser light; and wherein said portion of said container is said first container end.

13. Method, as claimed in claim 12, wherein:

said first container end includes at least one mark different from said plurality of markings and said one mark was part of said first container end while said first container end was contained in said package.

14. Method, as claimed in claim 1, wherein:

said outputting step includes determining a location for said portion of said container using information from a vision control.

15. Method, as claimed in claim 14, wherein:

said portion includes a container end and said vision control captures information related to location of a tab.

16. Method, as claimed in claim 1, wherein:

said portion includes a container end and said method further includes providing a signal related to movement of said container end by a container end system control to each of a vision control and a laser control that are in communication with each other.

17. Apparatus for forming markings on a portion of a container, comprising:

a transfer belt for conveying at least a portion of a first container;

a rotatable mechanism for producing a rotating output that rotates 360°, said transfer belt being moved using said rotating output;

a laser system that outputs laser light;

a light path deflection system configured to receive said laser light and position said laser light along a path toward the portion of the container; and a control that outputs control signals used in controlling at least one component of said light path deflection system;

wherein said laser light marks the portion of the first container with at least a first marking during a dwell time in which the portion of the container is substantially stationary, said dwell time being in a range of times related to rotation of said rotating output of at least 30° and no greater than 300°.

18. Apparatus, as claimed in claim 17, wherein:

said control signals are used in controlling movement of said at least one component.

19. Apparatus, as claimed in claim 18, wherein:

said at least one component is a first mirror having a nominal dimension of less than about 5 mm.

20. Apparatus, as claimed in claim 17, wherein:

said control signals are used to control at least one of retrieving, creating and selecting desired characters that are at least part of the markings on the portion of the container.

21. Apparatus, as claimed in claim 17, wherein:

said dwell time is less than 100 milliseconds.

22. Apparatus, as claimed in claim 21, wherein:

said light path deflection system includes a first mirror and a first galvanometer and said first mirror presents a moment of inertia to said first galvanometer of less than about 0.1 g/cm$^2$.

23. Apparatus, as claimed in claim 17, wherein:

said laser system and said laser light path deflection system are located adjacent a container end transport.

24. Apparatus, as claimed in claim 17, wherein:

said laser system and said light path deflection system are located adjacent a container end transport that moves container ends having tabs.

25. Apparatus, as claimed in claim 17, wherein:

the portion of the container is one of the following: an end of the container, a tab joined to an end of the container and at least a part of a body of the container.

26. Apparatus, as claimed in claim 17, wherein:

a portion of the container includes a container end with tab and said apparatus further includes a vision control that outputs location information to said control related to the container end and the tab and a system control that communicates with each of said control and said vision control.

27. Apparatus, as claimed in claim 26, wherein:

said system control provides a signal related to movement of the container end with tab to at least one of said control and said vision control.

28. Method for marking a portion of a container, comprising:

providing a number of container ends including a first container end;

providing a number of tabs including a first tab;

joining said number of container ends and said number of tabs including joining said first container end and said first tab together to produce a number of combined container ends and tabs;

packaging said number of combined container ends and tabs;

removing said number of combined container ends and tabs from said package; and marking, after said removing step, at least one of said first container end and said first tab.

29. Method, as claimed in claim 28, wherein:

said joining step includes tab forming from tab stock using a first system.

30. Method, as claimed in claim 29, wherein:

said marking step includes using a second system after transporting said combined container ends and tabs subsequent to said packaging step.

31. Method, as claimed in claim 28, further including:

repackaging said combined container ends and tabs after said marking step.

32. Method as claimed in claim 28, wherein:

said marking step includes positioning said laser light using a light path deflection system that includes at least one movable mirror.

33. Method, as claimed in claim 28, wherein:

said laser light is generated using a laser system and said combined first container end and said first tab has indicia that was provided before said marking step.

34. Method, as claimed in claim 28, wherein:

said marking step includes obtaining location information related to said at least one of said first container end and said first tab using a vision control and outputting from said vision control to a laser control, said location information being used in conducting said marking step.

35. Method, as claimed in claim 34, wherein:

said marking step includes controlling at least one of said vision control and said laser control using a system control that can output a signal related to movement of said combined container ends and tabs.

* * * * *